(12) United States Patent
Grendelmeier et al.

(10) Patent No.: US 11,627,826 B2
(45) Date of Patent: Apr. 18, 2023

(54) DEVICE AND METHOD FOR PREPARING FOODS ARRANGED IN A VESSEL

(71) Applicant: Carogusto AG, Amriswil (CH)

(72) Inventors: Thomas Grendelmeier, Hombrechtikon (CH); Philipp Schenk, Schönenberg (CH); Lukas Schmutz, Bern (CH)

(73) Assignee: Carogusto AG, Amriswil (CH)

( * ) Notice: Subject to any disclaimer, the term of this patent is extended or adjusted under 35 U.S.C. 154(b) by 389 days.

(21) Appl. No.: 16/755,961

(22) PCT Filed: Nov. 30, 2017

(86) PCT No.: PCT/EP2017/080982
§ 371 (c)(1),
(2) Date: Apr. 14, 2020

(87) PCT Pub. No.: WO2019/105554
PCT Pub. Date: Jun. 6, 2019

(65) Prior Publication Data
US 2020/0288898 A1    Sep. 17, 2020

(51) Int. Cl.
*A47J 27/04* (2006.01)
*A47J 27/16* (2006.01)

(52) U.S. Cl.
CPC .............. *A47J 27/04* (2013.01); *A47J 27/16* (2013.01); *A47J 2027/043* (2013.01)

(58) Field of Classification Search
None
See application file for complete search history.

(56) References Cited

U.S. PATENT DOCUMENTS

| 4,233,891 A | 11/1980 | Nugarus et al. |
| 2009/0252855 A1 | 10/2009 | Ewald et al. |
| 2015/0257573 A1 | 9/2015 | Gabara |

FOREIGN PATENT DOCUMENTS

| CN | 2641803 Y | 9/2004 | |
| CN | 101181129 A | 5/2008 | |
| CN | 101919652 A | 12/2010 | |
| CN | 104545488 A | 4/2015 | |
| CN | 205993941 U | 3/2017 | |
| CN | 106667238 A * | 5/2017 | .............. A47J 27/04 |
| CN | 206213855 U | 6/2017 | |
| CN | 107157315 A | 9/2017 | |
| DE | 3644519 A1 | 7/1988 | |
| DE | 102014202702 A1 * | 4/2015 | .............. A47J 27/16 |

(Continued)

OTHER PUBLICATIONS

International search report for patent application No. PCT/EP2017/080982 dated Jul. 4, 2018.

*Primary Examiner* — John J Norton
(74) *Attorney, Agent, or Firm* — Bachman & LaPointe, P.C.

(57) ABSTRACT

A device (1) for preparing foods received in a vessel (2), in particular ready meals, the device (1) including a steam generator unit for generating steam, and a steam delivery unit (4) which is connected to the steam generator unit in a steam-conducting manner via a steam feed line (23) and which has a steam probe (5) with at least one steam discharge opening, wherein the device (1) has a coupling mechanism (10) which includes a locking mechanism and which releasably connects the steam delivery unit (4) to the steam feed line.

19 Claims, 9 Drawing Sheets

(56) References Cited

FOREIGN PATENT DOCUMENTS

| DE | 102015221004 A1 | | 4/2017 | |
|---|---|---|---|---|
| DE | 102015221005 A1 | | 4/2017 | |
| KR | 101482218 B1 | | 1/2015 | |
| KR | 1539358 B1 | * | 7/2015 | |
| KR | 2016035489 A | * | 3/2016 | |
| KR | 1624581 B1 | * | 5/2016 | .............. A47J 27/04 |
| KR | 2017030882 A | * | 3/2017 | .............. A47J 27/14 |
| KR | 2017056740 A | * | 5/2017 | .............. A47J 27/16 |
| KR | 1847006 B1 | * | 4/2018 | .............. A47J 27/04 |
| WO | WO-2006072485 A1 | * | 7/2006 | .............. A47J 27/04 |

* cited by examiner

DEVICE AND METHOD FOR PREPARING FOODS ARRANGED IN A VESSEL

BACKGROUND OF THE INVENTION

The invention relates to a device for preparing foods received (arranged) in a vessel, in particular ready meals, as disclosed herein, the device comprising a steam generator unit, preferably disposed in a housing, for generating steam, and a steam delivery unit which is connected to the steam generator unit in a steam-conducting manner via a steam feed line and which has a steam probe having at least one steam discharge opening.

Furthermore, the invention relates to a method for operating such a device as disclosed herein.

DE 10 2015 221 005 A1 describes a device for preparing foods arranged in a vessel, the device comprising a steam delivery unit which is firmly connected to a steam feed line, said steam delivery unit having a plurality of steam probes for introducing steam into a ready meal to be heated, the steam delivery unit being rotatable about an axis of rotation in order to allow for an improved distribution of the steam and for stirring the ready meal. The known device has proven its worth. However, there exists a demand for more convenient cleaning and for an improved steam distribution in or on the food.

US 2009/0252855 relates to a device for steam injection heating, comprising a steam generator unit and a steam delivery unit which is connected to said steam generator unit via a steam feed line. The steam delivery unit is releasably connected to the steam feed line via a thread.

DE 10 2015 221 005 A1 and U.S. Pat. No. 4,233,891 A also relate to devices for preparing foods by means of steam injection. Each of the devices comprises a steam generator unit and a steam delivery unit which is connected to said steam generator unit via a steam feed line. The steam delivery unit is connected to the steam feed line, DE 10 2015 221 005 A1 providing a swivel joint disposed between the steam delivery unit and the steam feed line and U.S. Pat. No. 4,233,891 A disclosing a screw socket for clamping them together.

DE 36 44 519 A1 discloses a device for preparing cappuccino having a milk froth generating function, comprising a steam generator unit and a superheated steam tube which is connected to said steam generator unit via a steam feed line. The superheated steam tube is releasably connected to the steam feed line by means of a coupling.

SUMMARY OF THE INVENTION

Starting from the aforementioned state of the art, the object of the invention is to indicate a device for preparing foods arranged in a vessel which can be cleaned more easily and which distributes the steam in an improved manner and an improved method for operating such a device.

Concerning the device, said object is attained by the features disclosed herein, i.e., concerning a generic device, by the fact that the device has a coupling mechanism comprising locking means for connecting the steam delivery unit to the steam feed line in a releasable manner, in particular without using tools. For this purpose, the steam delivery unit preferably comprises a, in particular elongated, connecting section for the, in particular translational, coupling with, preferably introduction into, the coupling mechanism.

Concerning the method, the object is attained by the features disclosed herein, i.e. concerning a generic method, by the fact that after the, in particular manual, release (unlocking) of the locking means, the steam delivery unit is separated from the steam feed line and is preferably cleaned afterwards, in particular in a dishwasher.

Advantageous embodiments of the invention are disclosed herein and in the dependent claims. All combinations of at least two features disclosed in the description, the claims and/or the figures constitute part of the scope of the invention.

In order to avoid repetitions, disclosed features relating to the device are also seen as relating to the method and are thus also claimable therefor. In the same manner, disclosed features relating to the method are also seen as relating to the device and are thus also claimable therefor.

The idea of the invention is not to fix the steam delivery unit to the steam feed line in a permanent manner, but to dispose the steam delivery unit at said steam feed line in a releasable manner so that after preparing, in particular heating, a given number of foods, preferably ready meals, the steam delivery unit can be cleaned separately from the steam feed line, for example in an automated manner in a dishwasher, which is typically available in the catering sector or in the household sector, instead of having to be cleaned manually at the device or at a housing of the device, as was previously the case. A far more efficient and more convenient cleaning is thus possible.

In order to realize the invention, the device comprises a coupling mechanism for connecting the steam delivery unit to the steam feed line in a releasable manner, the coupling mechanism comprising locking means by means of which the steam delivery unit can be locked or secured in an installation or fixing position, in particular against removal against an installation or fixing direction. The coupling mechanism is preferably realized in such a manner that the steam delivery unit can be installed and fixed, in particular a connecting section of the steam delivery unit can be axially introduced into the coupling mechanism, by a translational installation movement, preferably along an axis of rotation to be described below, the steam delivery unit being rotatable about said axis of rotation, preferably together with the coupling mechanism, according to a preferred embodiment in order to improve the steam distribution. Alternative embodiments of the coupling mechanism and of its locking means can be realized, for example in the form of a quick lock for an installation without using tools, for example in the form of a bayonet lock.

According to the invention, a configuration of the device and of the method is proposed in which at least a section of the steam delivery unit comprising the steam probe, in particular the entire steam delivery unit (which is detachable or can be fixed in a releasable manner) is rotatable, in particular back and forth, about an axis of rotation in order to distribute the steam in the food in an improved manner and/or to stir the food. In particular with respect to the preparation of specific foods, such as spaghetti, said rotational movement is preferably realized as a back-and-forth movement, i.e. as an alternating movement in two opposite directions of rotation, in order to avoid a winding of the foods around the at least one, preferably several steam probes. The axis of rotation, which is preferably realized as a vertical axis, is preferably also an axis of installation in which the steam delivery unit is to be displaced in a translational manner to be connected to the coupling mechanism and to be locked and in which said steam delivery unit is to be displaced in the opposite direction in order to be released or detached. In order to be able to rotate the steam delivery unit about the axis of rotation, the coupling mechanism comprises corresponding torque transmission means for establishing a torque-transmitting operative connection to a particularly preferably electromotive drive motor which is preferably disposed in a housing of the device. The torque transmission means particularly preferably have a, in particular centric, reception which engages into corresponding radial recesses of an aforementioned, in particular elongated, connecting section of the steam delivery unit, more precisely a drive section of the connecting section, in the radial direction in relation to the axis of rotation when the steam delivery unit is installed in order to be able to drive the steam delivery unit in a rotating manner. The torque transmission means are particularly preferably also realized as a gear wheel or have a gear ring at the outer circumference, its gearing being connected to a drive motor in a corresponding torque-transmitting manner, in particular via at least one gear wheel or a drive screw. The torque transmission means preferably interact with the aforementioned connecting section of the steam delivery unit, which preferably extends along the axis of rotation.

In a particularly preferred embodiment of the device and of the method, a hood which is separate from the steam delivery unit is disposed on the steam delivery unit, in particular above the steam probes, said hood realizing a cooking chamber together with the vessel (preferably not part of the device), in which steam is applied to the food. Preferably, the hood has the function of a hold-down device and is pushed against the vessel in an operating state of steaming, the steam delivery unit being rotatable in relation to the hood about the axis of rotation. In an embodiment of the invention, the hood can be removed, i.e. detached or separated from the coupling mechanism, together with the steam delivery unit. The hood is preferably loosely positioned on or is fixed to the steam delivery unit so as to be removable, preferably without using tools, and said hood is trapped between a lower part of the steam delivery unit, which comprises the at least one steam probe, and a housing of the device, in particular a housing of the lifting unit, when the steam delivery unit is fixed to the coupling mechanism, and the hood can easily be removed from the steam delivery unit by a user and can be cleaned separately from said steam delivery unit, in particular in a dishwasher, after removing the steam delivery unit from the coupling mechanism. The hood is preferably penetrated by the aforementioned connecting section of the steam delivery unit along the axis of rotation.

In a particularly preferred embodiment, the locking means are realized for automatic locking, in particular axial securing, of the steam delivery unit to the coupling mechanism by transferring the steam delivery unit into a fixing or installation position, in particular in a translational, preferably manual, manner. For this purpose, the locking means preferably comprise spring means which allow for an automatic opening of the locking means during the installation process (in particular the insertion process of the connecting section into the coupling mechanism), the spring means ensuring that the locking means are automatically retransferred into a locking state once a target installation or fixing position of the steam delivery unit in the coupling mechanism has been reached, a steam-conducting connection to the steam feed line being established in said target position. Thus, the device can be operated in a particularly convenient manner. For the purpose of unlocking, the locking means have to be transferred into a release or unlocking position (release state), preferably manually or by means of a drive, and the connecting section can then be removed from the coupling mechanism.

More specifically, the locking means preferably comprise a locking element for direct interaction with the steam delivery unit, in particular with a locking section, in particular realized on an end of the aforementioned connecting section, the locking element being displaceable, preferably by rotation, between a locking position, which prevents the removal of the steam delivery unit, and a release position. The locking element thus releases an axial installation and removal path, preferably in a release position, said path being blocked in the locking position. To do so, the locking element preferably interacts with the aforementioned locking section of the connecting section of the steam delivery unit. The locking section is preferably axially separated from a torque absorption section of the connecting section, in particular via some kind of a trough or circumferential groove, the locking element engaging into said axial gap in its locking position in order to prevent a removal of the steam delivery unit against the, preferably axial, direction of installation. For displacing the locking element between its release position and its locking position, a manual or automated actuation unit, particularly preferably comprising a swing lever, is provided. A spring force is applied to the locking element, preferably in the direction of its locking position, in particular by providing a torsion spring, and said locking element has to be displaced against the spring force from the locking position into the release position by means of the actuation unit.

In particular to allow for a rotation of the steam delivery unit together with the coupling mechanism in the installed and secured state of the steam delivery unit, an embodiment of the invention provides a releasable, i.e. non-permanent, force-transmitting coupling of the actuation unit, in particular of a swing lever of the actuation unit, with the locking element and a decoupling, in particular spacing, of the actuation unit from the locking element in the locking position of the locking element, the locking element, in particular the entire coupling mechanism, thus being rotatable about the axis of rotation together with the steam delivery unit. In other words, the actuation unit, in particular a swing lever of the actuation unit, can be displaced between a first and a second displacement position and is not coupled with the locking element in a torque-transmitting manner in both final displacement positions—the locking element is free in one of said positions and can rotate together with the steam delivery unit.

It is particularly advantageous if the actuation unit has a gearing section for meshing with a gear ring of the locking element. Said gearing section is particularly preferably realized and/or disposed in a resilient manner in the radial direction in relation to the gear ring in order to allow for a jumping of the gearing section (tooth segment) in the possible event that the gearing section and the gear ring meet tooth to tooth.

In order to further reduce a possible tooth-to-tooth problem between the gearing section of the actuation unit and the gear ring of the locking element, synchronization means for synchronizing a gearing of the gearing section and a gearing of the gear ring are assigned to the gearing section according to an embodiment of the invention, the synchronization means being preferably actuatable by displacing the actuation unit, in particular a swing lever of the actuation unit. The synchronization means are preferably realized in such a manner that said synchronization means rotate the locking element, preferably the entire coupling mechanism, a little about the axis of rotation before the gearing section of the actuation unit engages with the gear ring of the locking element in such a manner that the teeth of the gearing section reliably engage in the tooth spaces or gaps of the gear ring.

The synchronization means preferably comprise a preferably hook-shaped synchronization element, in particular realized and/or disposed in a resilient manner, said synchronization element having at least one synchronization tooth for meshing with the gear ring of the locking element or with a facultative drive gear ring of the coupling mechanism for the rotating driving of the steam delivery unit, said drive gear ring being rotatable together with the gear ring of the locking element. The drive gear ring is preferably in fixed alignment with the gear ring of the locking element, i.e. disposed in a non-rotatable manner, at least in the locking position of the locking element, in particular via the aforementioned spring means which are preferably provided and which permanently apply a spring force to the locking element in its locking position. The synchronization tooth is offset in relation to the teeth of the gearing section, preferably by a distance which is not evenly divisible by a tooth extension of a tooth of the gearing of the gearing section. In other words, said distance does not correspond to a multiple of the tooth pitch. Said synchronization means are preferably realized in such a manner that they synchronize said gearing of the gear ring with the gearing section of the actuation unit by rotating the gear ring before the gearing section of the actuation unit meshes with the gear ring, i.e. engages with the gear ring.

In an embodiment of the invention, the device comprises sensor means which ensure the operational reliability. Preferably, sensor means for monitoring a state (locking state and/or release state) of the locking means are provided. Said sensor means are preferably connected to a controller of the device which causes or enables a steam delivery only if a locking state is detected by the sensor means. Alternatively or preferably additionally, sensor means are provided by means of which it can be monitored if one steam delivery unit is (actually) disposed in the coupling mechanism in a releasable manner, i.e. if the steam delivery unit is in an installation position which is connected to the steam feed line. Such sensor means are preferably (also) connected to the controller of the device, an initiation or release of steam taking place only if the sensor means detect the presence or a corresponding disposition of the steam delivery unit.

It is particularly advantageous if a preferably guided positioning element is assigned to the sensor means, in particular to the sensor means for monitoring a state of the locking means, said positioning element being displaceable by actuating the locking means, in particular by rotating the locking element, in relation, in particular axially, to a sensor of the sensor means, in particular to a switch of the sensor means, in order to actuate said switch, if provided, and thus to sense or detect a locking and/or release state of the locking means if a switch is provided.

In a preferred embodiment, the device comprises a relative movement drive, in particular a lift drive, for causing a translational relative movement between the steam delivery unit and the vessel and/or a surface supporting the vessel, an active displacement of the steam delivery unit and/or the vessel being generally made possible. However, another preferred embodiment comprises a fixed vessel and a steam delivery unit which can be actively displaced in relation to the vessel. According to a particularly preferred embodiment, a placing of an aforementioned hood, which is provided in an embodiment of the invention, on the vessel and a holding-down of the vessel or an application of force to the vessel is ensured and a cooking chamber, in which the steaming takes place, is realized between the hood and the vessel via the lift drive. A lifting unit comprising the coupling mechanism is preferably displaced in the vertical direction by means of the lift drive, the coupling mechanism, as well as a preferably electromotive drive for rotating the coupling mechanism together with the steam delivery unit fixed therein, being preferably disposed in a housing of the lifting unit.

In a particularly preferred embodiment, the steam delivery unit is composed of several parts and has a lower part which has several steam probes, said lower part limiting a steam distribution chamber together with a lid part fixed thereto, the steam being distributable to the several steam probes in said steam distribution chamber. In the steam distribution chamber, preferably several steam distribution lines each run between one of the steam probes and a steam distribution section of a preferably central steam line in the steam delivery unit. The distribution lines and/or the steam distribution section are preferably made of metal.

Furthermore, the invention relates to a method for operating a device described in detail above. The disclosed features relating to the device are also seen as relating to the method. The method is characterized in that after the, in particular manual, unlocking of the locking means, i.e. after transferring the locking means into a release operating state or a release position, the steam delivery unit is separated from the steam feed line (and from the coupling mechanism), preferably together with an aforementioned, facultative hood for realizing a cooking chamber. In a particularly preferred additional method step, the steam delivery unit and, where applicable, the hood disposed on the steam delivery unit in a removable manner is or are cleaned, in particular after removing the hood, in particular in a dishwasher.

BRIEF DESCRIPTION OF THE DRAWINGS

Further advantages, features and details of the invention can be derived from the following description of preferred exemplary embodiments and from the drawings.

In the following.

In the figures, the same elements and elements having the same function are referenced with the same reference numerals.

DETAILED DESCRIPTION

Figure 1:
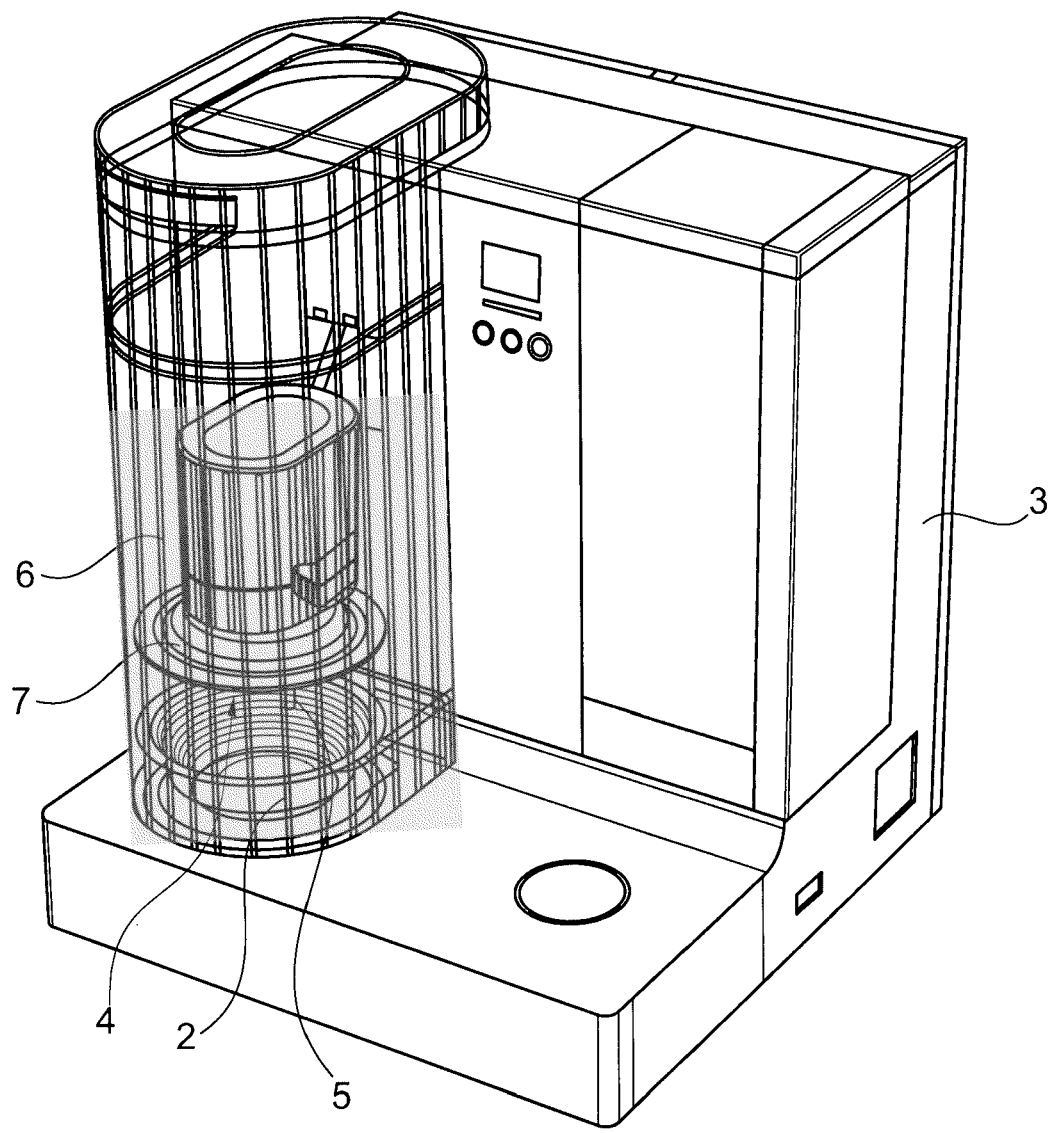
FIG. 1 is a perspective view of a device according to the idea of the invention for preparing foods arranged in a vessel which is suitable and intended for implementing the method according to the invention.

In FIG. 1, a device 1 for preparing foods arranged in a vessel 2 is shown. Device 1 comprises a housing 3 having a steam generator unit (not shown) disposed therein and, where applicable, a steam overheating unit disposed downstream of the steam generator unit for providing steam. Depending on the specific embodiment of device 1, the steam can be generated using water stored in a water tank of the device and/or using fresh water supplied by means of a fresh water connection. The steam generator unit is connected to a steam delivery unit 4 in a steam-conducting manner via a steam feed line (not shown) (cf. reference numeral 23 in FIG. 4), said steam delivery unit 4 comprising several elongated steam probes 5 each having at least one outlet opening or steam discharge opening. In the shown exemplary embodiment, a lifting unit referenced with reference numeral 6 can be displaced by means of a lift drive in a translational manner along the vertical between the opening position shown in FIG. 1, in which a vessel can be disposed and removed from below steam delivery unit 4, and a lower functional position, in which a hood 7 positioned on steam delivery unit 4 is positioned on vessel 2 for realizing a cooking chamber. As will be explained below, steam delivery unit 4 can be rotated in relation to hood 7 about an axis of rotation which coincides with the vertical axis of displacement of lifting unit 6.

Figure 2:
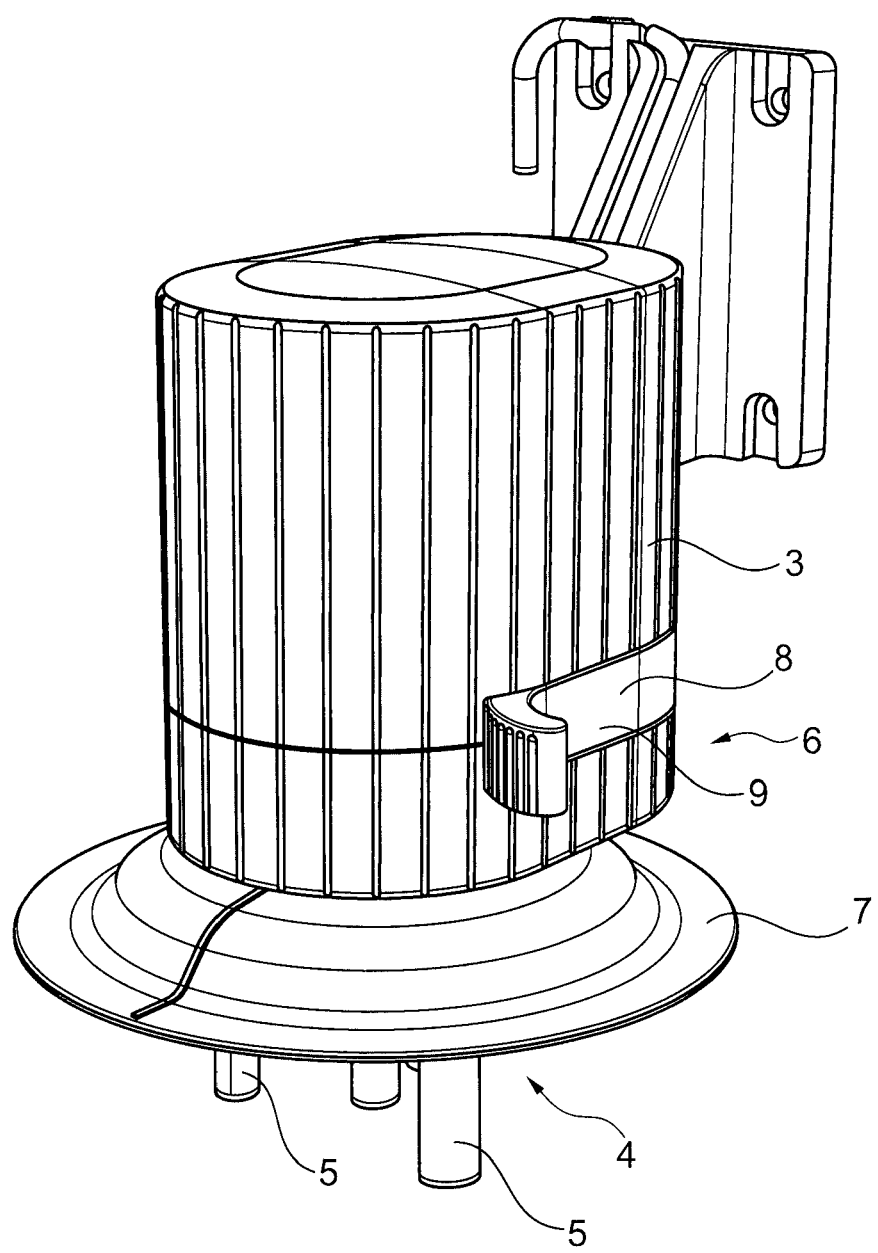
FIG. 2 is a perspective view of a unit of the device which can be displaced in the vertical direction by means of a lift drive and to which the steam delivery unit is fixed in a releasable manner.

FIG. 2 shows an enlarged view of lifting unit 6 to which steam delivery unit 4 is fixed in a releasable manner. Inside, lifting unit 6 comprises a coupling mechanism to be described below for receiving steam delivery unit 4, steam delivery unit 4 being lockable or securable against removal via locking means comprising an—in this case manual—actuation unit 8 having a swing lever 9.

Figure 3:
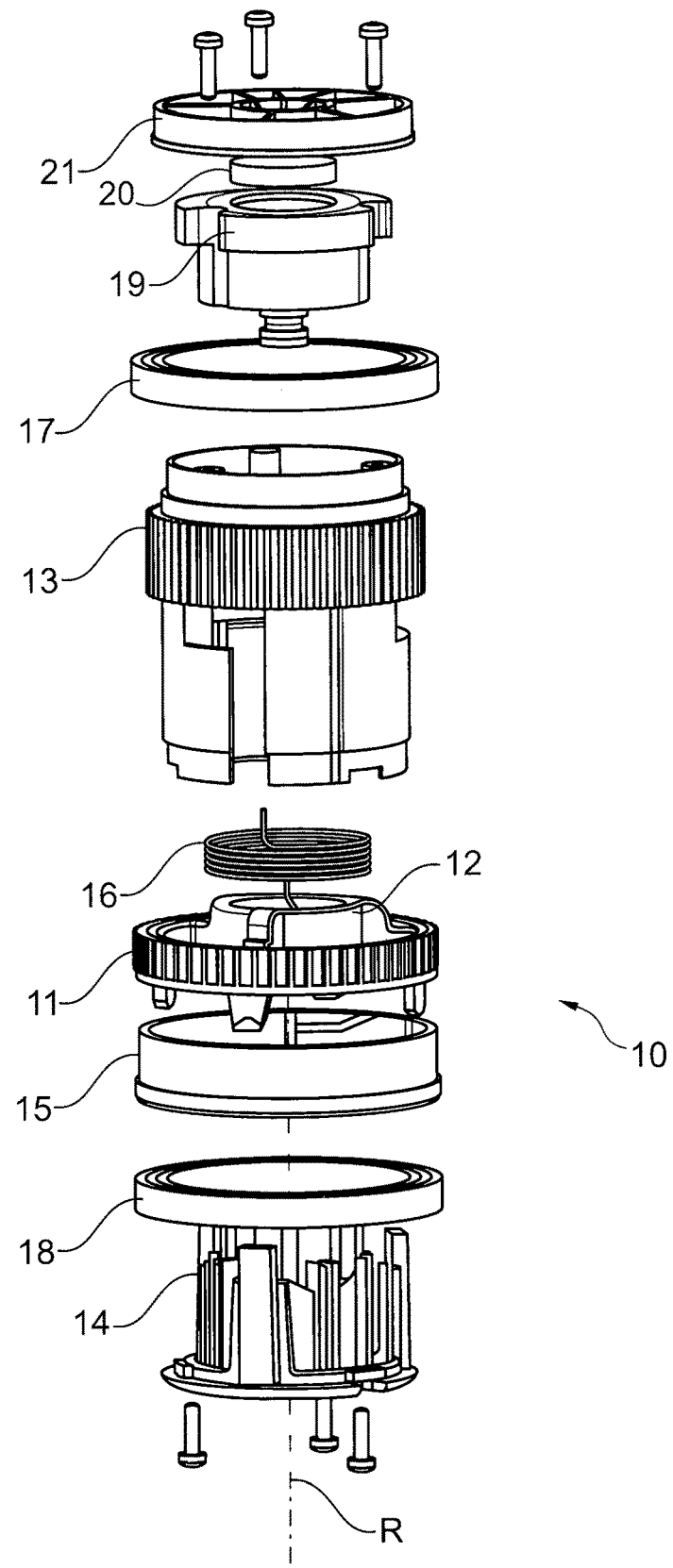
FIG. 3 is an exploded view of a coupling mechanism comprising locking means for receiving the steam delivery unit.

FIG. 3 shows an exploded view of aforementioned coupling mechanism 10. In the locked state of locking means 11, more precisely of a locking element 12, coupling mechanism 10 can be rotated about an axis of rotation R. For this purpose, coupling mechanism 10 comprises a drive gear ring 13, in the present case as a part of a bearing sleeve. In the installed state, drive gear ring 13 is fixed or disposed in a non-rotatable manner at a reception 14 for an elongated connecting section (cf. reference numeral 38 in FIGS. 10 and 11) of steam delivery unit 4. Together with drive gear ring 13, reception 14 is a part of torque transmission means for transmitting a drive torque of an electromotive drive motor (not shown) in housing 3, for example of lifting unit 6, cf. FIG. 2, and steam delivery unit 4. To this end, reception 14 engages in a radial manner into corresponding recesses in the drive section of the connecting section of steam delivery unit 4, steam delivery unit 4 thus being rotated about axis of rotation R, preferably back and forth, when drive gear ring 13 is rotated in the circumferential direction.

Figure 5:
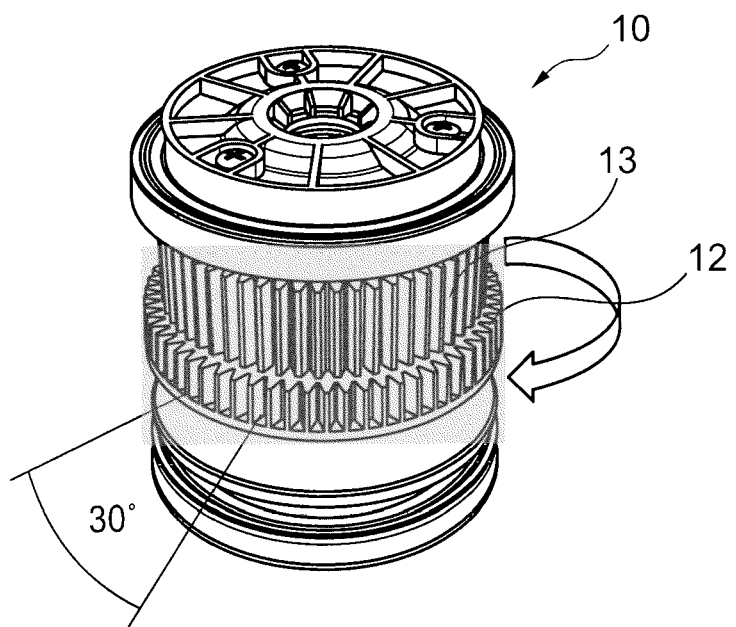
FIG. 5 is an exterior perspective view of the coupling mechanism when installed.

Furthermore, coupling mechanism 10 comprises aforementioned locking element 12 for locking or securing steam delivery unit 4 in coupling mechanism 10. As shown in FIG. 5, for this purpose, locking element 12 is rotatable about axis of rotation R by a limited angle of, for example, 30° in relation to drive gear ring 13, namely between a locking position and a release position. In the locking position, locking element 12 can be rotated about axis of rotation R together with or in a coupled movement synchronously with drive gear ring 13.

As will be explained below, a positioning element 15 is displaced in the axial direction in relation to a sensor 30 of sensor means via corresponding guide mechanisms when locking element 12 is being displaced between the release position and the locking position in order to sense the locking state.

As resulting from FIG. 3, locking element 12 is assigned a spring 16 (spring means) which is realized as a torsion spring in the present case, said spring 16 applying a spring force to locking element 12 in the direction of its locking position.

Furthermore, FIG. 3 shows that locking element 12, drive gear ring 13 and facultative positioning element 15 are axially received between two rolling bearings 17, 18 which are realized as deep groove ball bearings in the present case. Rolling bearings 17, 18 are used for the radial support of rotatable coupling mechanism 10 inside lifting unit 6.

FIG. 3 also shows that a centering piece 19 having an inner rotary seal 20 is axially received in the bearing sleeve comprising drive gear ring 13, centering piece 19 being fixed by means of a lid 21 which is screwed to the bearing sleeve.

Figure 4:
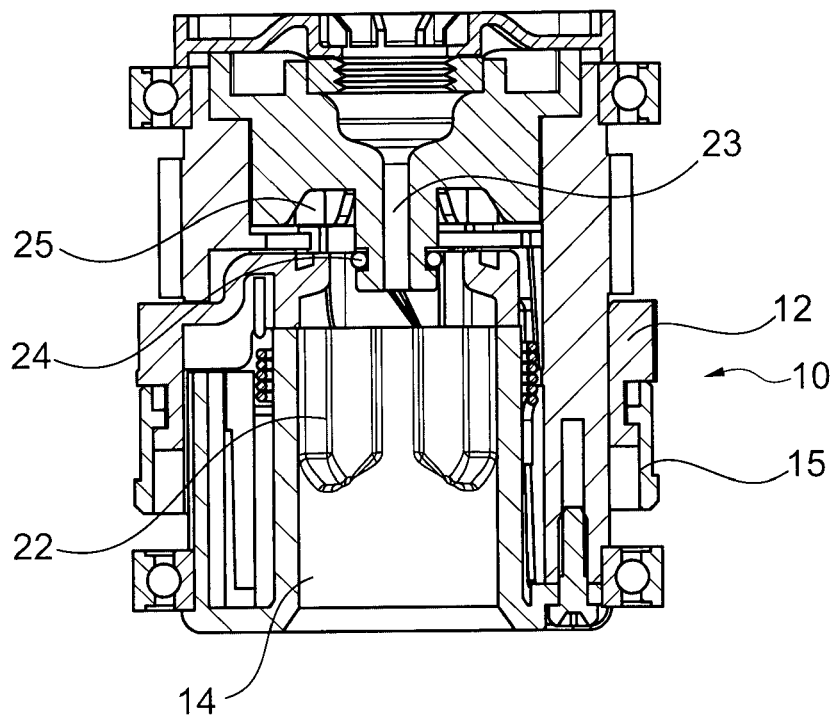
FIG. 4 is a sectional view of a lower part of the coupling mechanism.

FIG. 4 is a sectional view of coupling mechanism 10. In particular, reception 14 or drive webs 22 pointing radially inwards for the torque transmission to the introduced connecting or drive section (not shown) of steam delivery unit 4 is shown.

A steam feed line 23 ends in coupling mechanism 10, said steam feed line 23 being connected to the steam generator unit in a steam-conducting manner. Said steam generator unit has a ring seal 24 on the circumference, said ring seal 24 being realized as an O-ring seal for the radial sealing in relation to a, in particular central, steam line section in the connecting section of steam delivery unit 4 which can be removed in the shown figure.

Locking element 12 is also shown, said locking element 12 limiting or locking or blocking a locking chamber 25 disposed above in the locking position and releasing said chamber in the release position, steam delivery unit 4 thus being axially removable.

Figure 6:
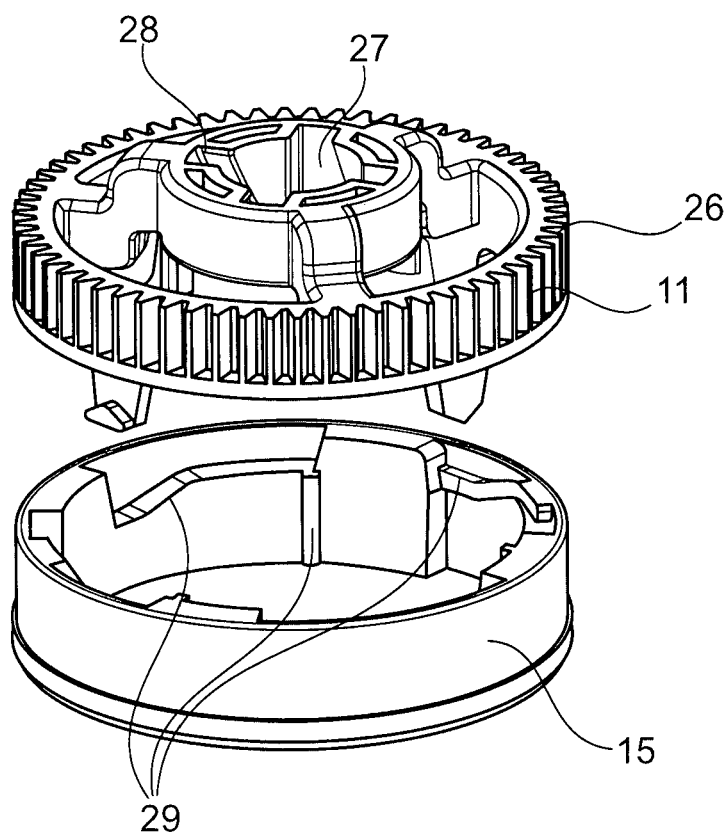
FIG. 6 is a view of a functional unit of the coupling mechanism comprising a locking element and a positioning element which can be displaced in a translational manner, in the present case in a vertical manner, by rotating the locking element and which serves to interact with sensor means.
Figure 7:
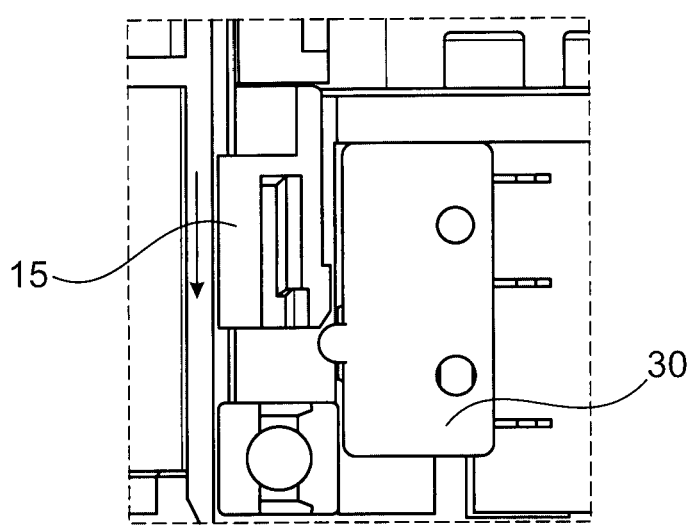
FIG. 7 shows the functional unit according to FIG. 6 interacting with a sensor which is realized as a micro switch.

FIGS. 6 and 7 show further details for detecting or sensing a state of locking means 11. Locking element 12 having gear ring 26 disposed on the outer circumference is shown. Furthermore, an axial through channel 27 which has four radial sections 28 disposed in a cruciform manner in the present case is shown, a connecting section of steam delivery unit 4 realized in a matching manner being passable through said radial sections 28 in the release position, namely by introducing a locking section of connecting section into locking chamber 25 according to FIG. 4. By rotating locking element 12, radial sections 28 are then rotated or offset in relation to the matching sections of the connecting section or of the locking section, said section thus not being removable against the direction of installation.

By rotating locking element 12, positioning element 15 is displaced axially along the axis of rotation, namely upwards or downwards via corresponding guide mechanisms 29, depending on the direction of rotation. As shown in FIG. 7, positioning element 15 starts to interact with a sensor 30, which is realized as a micro switch, of the sensor means for detecting a state (locked and/or unlocked) of the locking means when positioning element 15 is axially displaced in a downward direction. Additional sensor means for detecting steam delivery unit 4 in its installation position are not shown. It is conceivable to use a pressure switch, but also other sensors such as a magnetic sensor, etc.

Figure 8B:
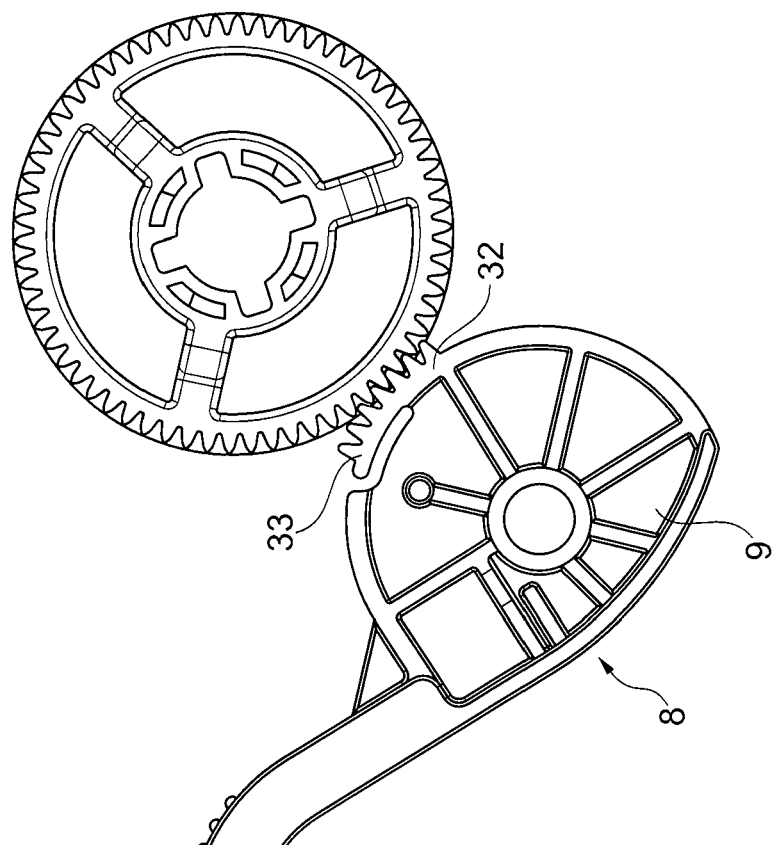
FIG. 8b shows the configuration according to FIG. 8a in a locking position.
Figure 8A:
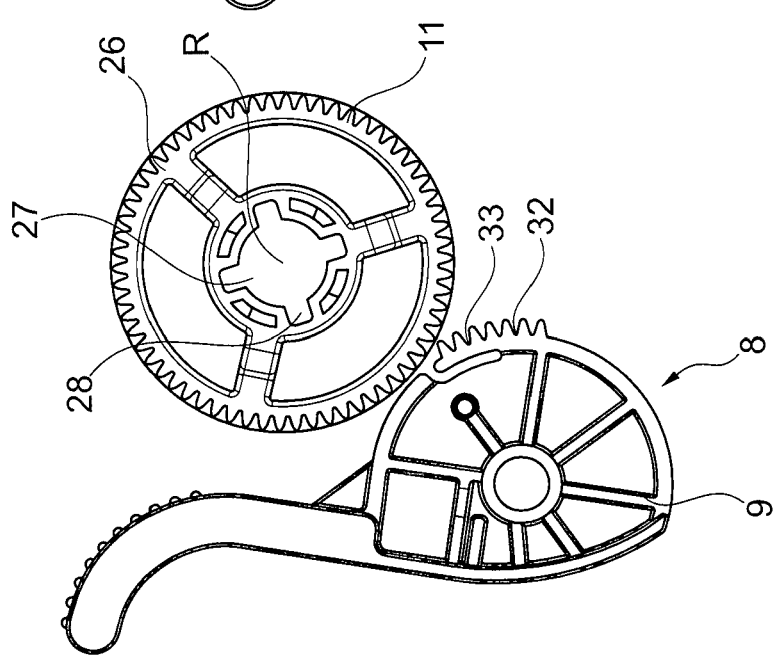
FIG. 8a is a view of an actuation unit of the locking means comprising a swing lever and shows the locking element, which can be displaced by means of said locking means, in a release position.
Figure 9B:
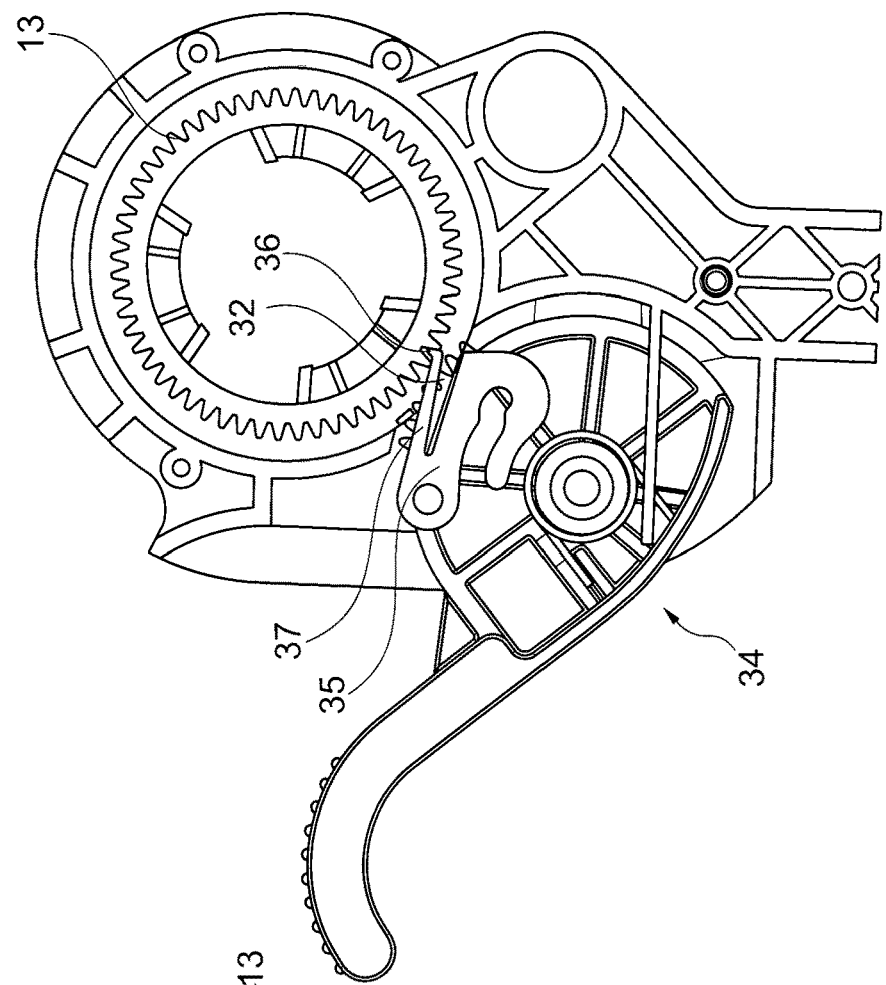
FIG. 9a and FIG. 9b show different operational states of the locking means with integrated synchronization means for synchronizing a gear ring of the locking element with a gearing section of the actuation unit.
Figure 9A:
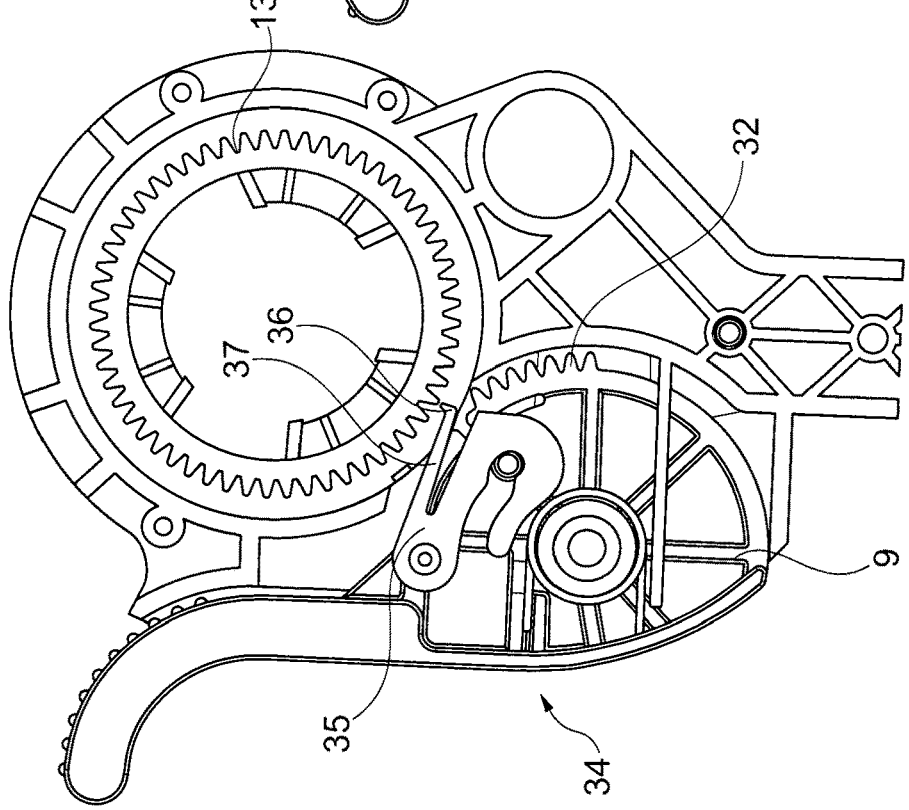

In order to displace locking element 12 from its release position (cf. FIG. 8a) into a locking position shown in FIG. 8b, an actuation unit 8 is provided which can be manually actuated in the present case. Actuation unit 8 comprises aforementioned swing lever 9 which can be swung between two positions, i.e. the first swing position shown in FIG. 8a, in which a gearing section 32 does not engage with locking element 12 and coupling mechanism 10, coupling mechanism 10 thus being freely rotatable about axis of rotation R. In the second position, which is shown in FIG. 8b, gearing section 32 engages with the teeth of gear ring 26 of locking element 12.

Gearing section 32 is realized in a resilient manner in the radial direction in a spring section 33 in order to allow for a jumping in relation to or on gear ring 26 or locking element 12 in the case of a possible tooth-to-tooth meeting at gearing section 32 and gear ring 26.

In order to reduce the risk of the tooth-to-tooth meeting, device 1 comprises synchronization means 34 in the present case by means of which coupling mechanism 10 can be rotated a little in order to synchronize the gearing of gearing section 32 and the gearing of gear ring 26 before said gearings engage with one another in a meshing manner. For this purpose, synchronization means 34 can either directly interact with gear ring 26 of locking element 12 or with drive gear ring 13, said embodiment being preferred and realized in the present case.

In the present case, synchronization means 34 comprise a hook-shaped synchronization element which acts as locking lever 35 and which blocks the bearing sleeve or drive gear ring 13 when swing lever 9 is actuated. Engagement is realized by means of a tooth 36 of the synchronization element, said tooth being an end section of a hook 37 which is realized in a resilient manner in the radial direction in relation to drive gear ring 13.

Figure 10:
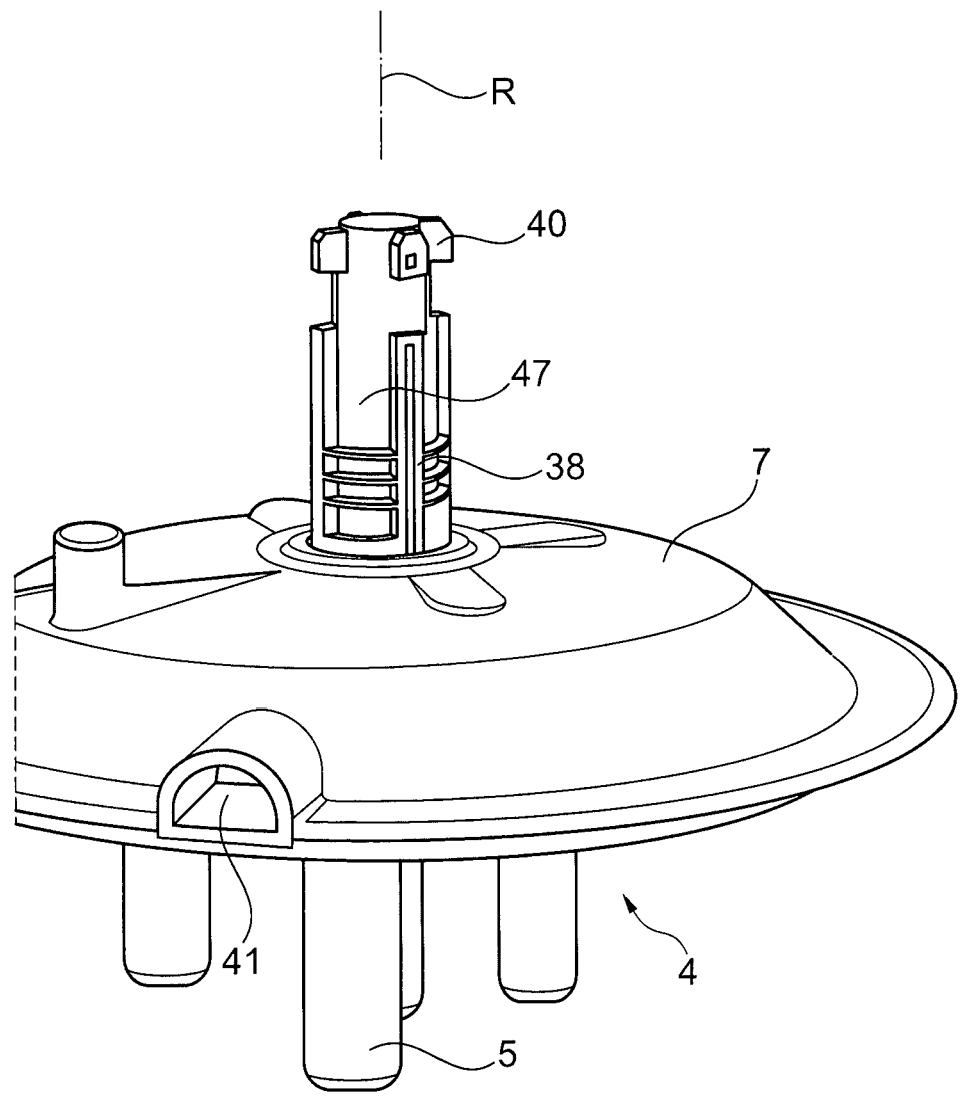
FIG. 10 is a perspective view of the steam delivery unit with a hood which is positioned on the steam delivery unit for realizing a cooking chamber with a vessel which contains the food to be heated.

FIG. 10 partly shows a preferred embodiment of steam delivery unit 4 having steam probes 5 extending along axis of rotation R, said steam probes 5 having steam outlet openings at their ends. In a preferred embodiment, hood 7 is loosely positioned on steam delivery unit 4, said hood 7 being axially penetrated by connecting section 38 of steam delivery unit 4. Connecting section 38 comprises a (lower) drive section 47 for the torque-transmitting coupling with reception 14, i.e. the torque transmission means of coupling mechanism 10 (cf. FIGS. 3 and 4) and a locking section 40 at one end, said locking section 40 being passable through channel 27 in the release position of locking element 12 and being held or blocked by locking element 12 in the locking position. Locking section 40 and drive section 47 are axially spaced from one another, locking section 40 of connecting section 30 being the axial, free end of said connecting section 30. The gap between drive section 47 and locking section 40 is formed as a slot or groove, locking element 12 engaging into said gap in order to secure the steam delivery unit against an axial removal in the locking position.

FIG. 10 shows that hood 7 has a lateral outlet 41 for excess steam during the heating process.

Figure 11:
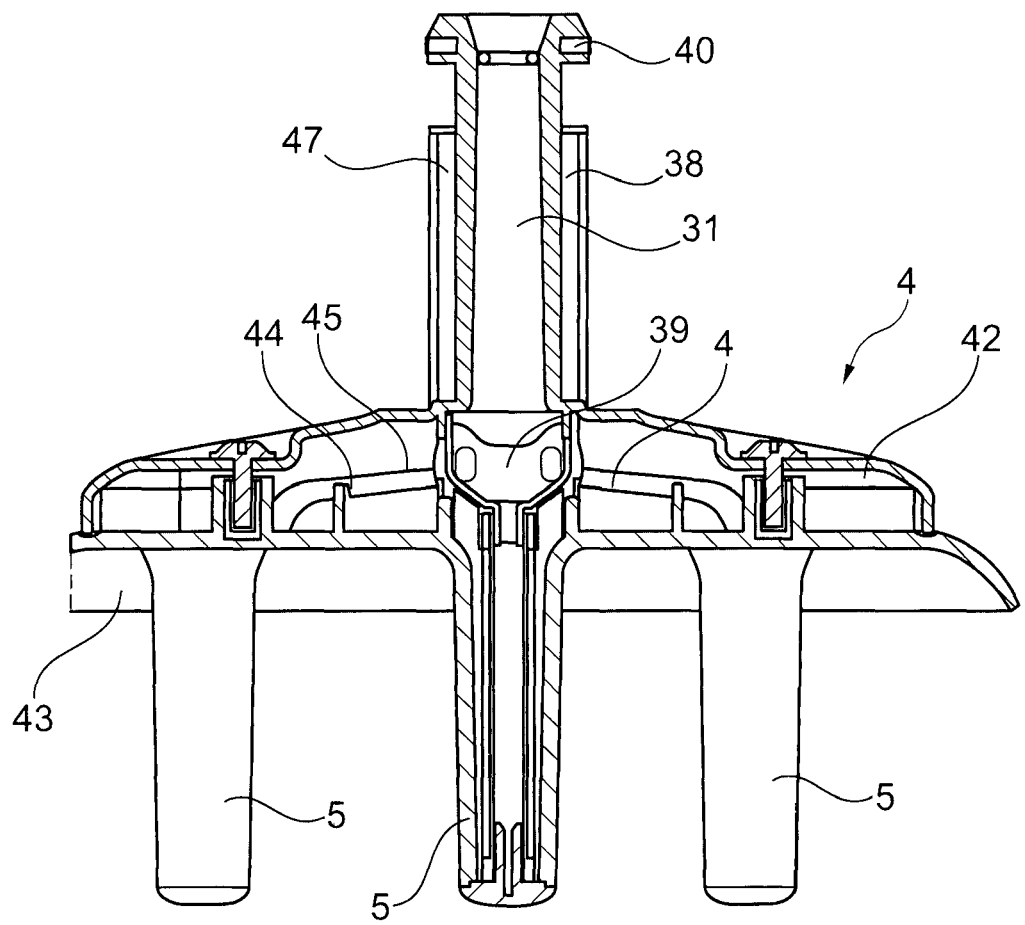
FIG. 11 is a sectional view of a preferred embodiment of the steam delivery unit.

FIG. 11 is a sectional view of steam delivery unit 4. Said steam delivery unit 4 is composed of several parts and comprises a plastic lid part 42 which is fixed to a lower part 43, which is also made of plastic, for example by means of screwing. Lower part 43 comprises a plurality of probes 5 into which steam is introduced via steam distribution lines 44 which are disposed inside a steam distribution chamber 45 limited by lid part 42 and lower part 43, and which connect steam probes 5 to a distribution section 39 of a central steam line 31 in connecting section 38, said steam line 31 being connected to steam feed line 23 (cf. FIG. 4) in a steam-conducting manner when steam delivery unit 4 is installed in coupling mechanism 10, said steam line 31 being rotatable in relation to steam feed line 23 (together with the other parts of steam delivery unit 4). Steam distribution lines 44 and distribution section 39 are made of metal.

REFERENCE SIGNS 1 device
2 vessel
3 housing
4 steam delivery unit
5 steam probe(s)
6 lifting unit
7 hood
8 actuation unit
9 swing lever of the actuation unit
10 coupling mechanism
11 locking means
12 locking element
13 drive gear ring
14 reception
15 positioning element
16 spring
17 rolling bearing
18 rolling bearing
19 centering piece
20 rotary seal
21 lid
22 drive webs
23 steam feed line
24 ring seal
25 locking chamber
26 gear ring
27 through channel
28 radial sections
29 guide mechanism
30 sensor
31 steam line
32 gearing section
33 spring section
34 synchronization means
35 locking lever
36 tooth
37 hook
38 connecting section
39 distribution section
40 locking section
41 outlet
42 lid part
43 lower part
44 steam distribution lines
45 steam distribution chamber
46 drive section
R axis of rotation

The invention claimed is:

1. A device for preparing foods received in a vessel (2), said device comprising a steam generator unit for generating steam, and a steam delivery unit (4) which is connected to the steam generator unit in a steam-conducting manner via a steam feed line (23) and which has a steam probe (5) having at least one steam discharge opening, the device (1) having a coupling mechanism (10) which comprises locking means (11) and which releasably connects the steam delivery unit (4) to the steam feed line (23), and at least a section of the steam delivery unit (4) comprising the steam probe (5) being rotatable about an axis of rotation (R), wherein the coupling mechanism (10) has torque transmission means for transmitting a drive torque to the steam delivery unit (4) when said steam delivery unit is connected to the steam feed line (23) in a steam-conducting manner.

2. The device according to claim 1, wherein the entire steam delivery unit (4) is rotatable back and forth about the axis of rotation (R).

3. The device according to claim 1, wherein a hood for realizing a cooking chamber together with the vessel (2) is disposed on the steam delivery unit (4), said hood being penetrated, along the axis of rotation (R) by a connecting section (38) of the steam delivery unit (4) which can be connected to the coupling mechanism (10), and said hood being removable together with the steam delivery unit (4) after unlocking the locking means (11).

4. The device according to claim 1, wherein the locking means (11) are realized for automatic locking of the steam delivery unit (4) by transferring the steam delivery unit (4) into a fixing position.

5. The device according to claim 4, wherein the locking means (11) are realized for axial securing of the stream delivery unit (4) by transferring the steam delivery unit (4) into the fixing position.

6. The device according to claim 1, wherein the locking means (11) comprise a locking element (12) which can be displaced between a locking position and a release position, and wherein the locking element (12) can be displaced between its locking position and its release position by manual or automatic displacement of an actuation unit (8) comprising a swing lever (9).

7. The device according to claim 6, wherein the actuation unit (8) can be coupled with the locking element (12) in a releasable and force-transmitting manner and wherein the actuation unit (8) is decoupled from the locking element (12) in the locking position, the locking element (12) thus being rotatable.

8. The device according to claim 7, wherein the actuation unit (8) has a gearing section (32) for meshing with a gear ring (26) of the locking element (12), said gearing section being realized and/or disposed in a resilient manner.

9. The device according to claim 8, wherein synchronization means (34) for synchronizing a gearing of the gearing section (32) and a gearing of the gear ring (26), by displacing the actuation unit (8), are assigned to the gearing section (32).

10. The device according to claim 9, wherein the synchronization means (34) have a hook-shaped synchronization element, realized and/or disposed in a resilient manner, said synchronization element having at least one synchronization tooth for meshing with the gear ring (26) of the locking element (12) or with a facultative drive gear ring (13) for rotating driving of the steam delivery unit (4), said drive gear ring being disposed in a non-rotatable manner in relation to the gear ring (26), and wherein the synchronization tooth is offset in relation to the teeth (36) of the gearing section (32) by a distance which is not evenly divisible by a tooth extension of a tooth (36) of the gearing of the gearing section (32).

11. The device according to claim 7, wherein the locking element (12) is rotatable together with the steam delivery unit (4).

12. The device according to claim 6, wherein the locking element (12) can be displaced by rotating between the locking positon and the release position.

13. The device according to claim 1, wherein sensor means for monitoring a state of the locking means (11) and/or the presence of the steam delivery unit (4) are provided in an installation position which is connected to the steam feed line (23).

14. The device according to claim 13, wherein a slot-guided positioning element (15) is assigned to the sensor means, said positioning element being displaceable by actuating the locking means (11) by rotating the locking element (12), in relation, axially, to a sensor of the sensor means, for actuating a switch of the sensor means.

15. The device according to claim 1, further comprising a relative movement drive for causing a translational relative movement between the steam delivery unit (4) and the vessel (2), by displacing the steam delivery unit (4) in relation to the fixed vessel (2).

16. The device according to claim 15, wherein the relative movement drive is a lift drive.

17. The device according to claim 1, wherein the steam delivery unit (4) has a lower part (43) having several steam probes (5), said lower part limiting a steam distribution chamber (45) together with a lid part (42) fixed thereto, the steam being distributable to the several steam probes (5) in said steam distribution chamber.

18. A method for operating a device (1) according to claim 1, wherein after the manual unlocking of the locking means (11), the steam delivery unit (4) is separated from the steam feed line (23) and is cleaned afterwards, at least a section of the steam delivery unit (4) comprising the steam probe (5) being rotated about the axis of rotation (R) and the coupling mechanism (10) having the torque transmission means for transmitting the drive torque to the steam delivery unit (4) when it is connected to the steam feed line (23) in a steam-conducting manner.

19. A method for operating a device (1) according to claim 3, wherein the steam delivery unit (4) is removed from the steam feed line (23) together with the hood (7), said hood sitting loosely on said steam delivery unit.

* * * * *